United States Patent [19]
Chase

[11] Patent Number: 5,572,797
[45] Date of Patent: Nov. 12, 1996

[54] IMPROVED OPTICAL PLUMB AND LEVELING APPARATUS

[76] Inventor: George Chase, P.O. Box 460, Rumney, N.H. 03266

[21] Appl. No.: 311,214

[22] Filed: Sep. 23, 1994

[51] Int. Cl.$^6$ .................................................. G01C 15/00
[52] U.S. Cl. .............................. 33/286; 33/290; 33/299; 33/DIG. 21
[58] Field of Search ........................... 33/281, 282, 286, 33/290, 299, 227, DIG. 21

[56] References Cited

U.S. PATENT DOCUMENTS

| | | | |
|---|---|---|---|
| 2,775,423 | 12/1956 | Strass | 33/299 X |
| 3,242,340 | 3/1966 | Layne . | |
| 3,588,249 | 6/1971 | Studebaker | 33/290 X |
| 3,858,984 | 1/1975 | Denton et al. . | |
| 3,909,952 | 10/1975 | Lagasse | 33/286 X |
| 4,265,027 | 5/1981 | Burniski . | |
| 4,365,241 | 12/1982 | Byrum | 33/366 |
| 4,448,528 | 5/1984 | McManus . | |
| 4,700,479 | 10/1987 | Saito et al. . | |
| 4,720,920 | 1/1988 | Tudek . | |
| 4,841,136 | 6/1989 | Nakayama et al. . | |
| 4,854,704 | 8/1989 | Funazaki et al. . | |
| 4,993,161 | 2/1991 | Borkovitz . | |
| 5,012,585 | 5/1991 | DiMaggio | 33/286 |
| 5,212,889 | 5/1993 | Lysen | 33/286 |
| 5,367,779 | 11/1994 | Lee | 33/290 |

Primary Examiner—Thomas B. Will
Attorney, Agent, or Firm—Pearson & Pearson

[57] ABSTRACT

An apparatus for performing plumb and level functions includes a base unit that can be leveled in a horizontal plane. A detachable socket with a bearing surface rotates about a complementary bearing mechanism on the base unit about an axis of rotation that is vertical when the base unit is horizontal. The cavity carries a rotatable body that carries a battery-operated laser light-emitting diode for projecting a beam along a projection axis that is a radius from the center of the rotatable body. The rotatable body can move between vertical and horizontal positions to define a vertical extension of the axis of rotation to perform a plumb function or to a horizontal position to move the projected light beam in a horizontal plane.

27 Claims, 6 Drawing Sheets

IMPROVED OPTICAL PLUMB AND LEVELING APPARATUS

BACKGROUND OF THE INVENTION

1. Field of the Invention

This invention relates to optical leveling devices and more specifically to optical plumb and leveling devices that utilize laser beams.

2. Description of Related Art

Conventional mechanical plumb bobs comprise a weight located at the end of a string. When the string is suspended and the position of the plumb bob stabilizes, the string defines a vertical axis due to gravity.

In recent times a series of optical plumb apparatus have been developed. For example, U.S. Pat. No. 4,448,528 (1984) to McManus describes a portable laser vertical collimator and plumb line indicator. A laser device generates a pair of beams extending at 180° to each other. The laser is gimble mounted to swing freely within a wind-shielding housing and the center gravity of the apparatus lies below a gimble ring. The housing and included laser mount as a free pendulum that comes to rest with its center of gravity in vertical alignment with the intersection of perpendicular horizontal axes.

Another class of device, called level indicators or levels, includes devices with slightly arced vials with a bubble. The vials are located in a plane to define either a horizontal or vertical orientation or, with proper orientation of the vial, some other angle. Circular levels have also been provided whereby the plane of the level is horizontal when a bubble reaches an upper center portion of an enclosing cover. Some devices, such as disclosed in U.S. Pat. No. 4,720,920 (1988) to Tudek combine the conventional leveling function and electronics for producing signals when a device is level or parallel with gravity. Whereas each of these devices can define a level location in one position, it remains difficult to extend that level plane to some remote location as, from a center of a room to a remote wall.

A series of optical devices using light projectors have been developed to define a horizontal plane between a remote site and a reference site. For example, U.S. Pat. No. 3,242,340 (1966) to Layne discloses a photosensitive structure for controlling leveling and grading apparatus and for establishing levels. A mobile unit contains a radiation source that emanates light or other electro-magnetic waves in a horizontal plane. A receiver in a level determining unit indicates when the mobile station is level with the stationary station.

U.S. Pat. No. 4,841,136 (1989) to Nakayama et al. discloses a sighting apparatus that delivers a laser beam in any horizontal direction. A circular air bubble or leveling device on a table is used as input to develop a tilt signal such that the system can automatically correct for any non-horizontal orientation of the table.

Instruments also have been developed for combining the functions of plumb bobs and levelling devices using optical elements. U.S. Pat. No. 3,858,984 (1975) to Denton et al., for example, discloses an optical plumb leveler with a cylindrical housing mounted on a support by a universal joint. A weight connects to the cylindrical housing to align a beam emanating from a battery-powered lamp within the housing along a plumb line. An array of lenses condenses and projects the beam vertically. A planar mirror can be positioned in the beam to produce a 90° deflection of the light beam into a horizontal plane.

In U.S. Pat. No. 4,854,704 (1989) to Funazaki et al. a light source faces upwardly from a level mounting bed. A lens extends upwardly from a mounting bed to provide a collimated parallel light rays perpendicular to a true horizontal plane. A motorized rotatable reflector device can be interposed in the light beam to produce a horizontal array.

In U.S. Pat. No. 4,993,161 (1991) to Borkovitz a laser diode mounts on a pendulous platform.

This system produces both a vertical laser beam and, by the interposition of a deflecting lens, a horizontal beam.

Each of the foregoing references discloses a plumb bob, a leveler or combination that utilizes pendulum mechanisms and optical systems that increase the overall cost of constructing such devices. Consequently, the benefits of such devices are often limited to professionals who have a need for repeated frequent use of such devices that can justify the acquisition cost. These costs effectively preclude the availability to professional or amateur carpenters who may only have an occasional need for such an optical plumb bob or leveler. Consequently many of these individuals continue to use conventional mechanical plumb bobs and mechanical leveling devices to transfer one point to another along a wall, even though such processes are time consuming and subject to error.

SUMMARY

Therefore it is an object of this invention to provide an optical plumb and leveling apparatus that is simple and inexpensive to manufacture and easy to use.

Another object of this invention is to provide an optical plumb bob and leveler apparatus that is simple and inexpensive to construct and simple to use.

Still another object of this invention is to provide an optical plumb bob and leveler apparatus that is simple to use, self-contained and incorporates laser technology.

In accordance with one aspect of this invention, an optical plumb and leveling apparatus comprises a rotatable body having a circular cross section about a center point and includes a recessed compartment. A socket unit includes a cavity corresponding in form to a portion of the rotatable body whereby the rotatable body is adapted to move relative to the socket unit. The rotatable body also carries a laser light source in the recessed compartment for projecting a laser beam along a laser projection axis that is a radius from the center point. A level indicator can be attached to the rotatable body for indicating when the rotatable body is oriented with the laser projection axis in a predetermined direction.

In accordance with another aspect of this invention, an optical plumb leveler apparatus comprises a base unit for being positioned in a horizontal plane. The base unit includes a bearing for defining a base unit axis of rotation. A rotatable body having a predetermined peripheral shape and a circular cross-section about a center point includes a radially extending recessed compartment formed at a predetermined location in the rotatable body that includes the center point. A socket unit rotates on the bearing about the base unit axis of rotation and has a cavity corresponding to the peripheral surface of the rotatable body. The recessed compartment carries a laser light source that projects a laser beam along a laser projection axis that is a radius from the center point. The rotatable body can be positioned to project the laser beam to a predetermined elevation. Rotating the socket about the base unit axis moves the projected laser beam about the base unit axis.

In accordance with still another aspect of this invention, an optical plumb leveler apparatus comprises a base unit, a socket unit, a spherical body for carrying a laser light source and a brake assembly. The base unit includes adjustable feet for positioning the base unit in a horizontal plane and a bearing for defining a base unit axis of rotation that is vertical when the base unit is oriented in the horizontal plane. The socket unit rotates on the bearing and has a hemispherical cavity that receives the spherical body for rotation relative thereto. A radially extending, recessed compartment in the spherical body carries a battery-operated laser light source that projects the laser beam along a laser projection axis that lies along a radius of the spherical body. The spherical body can be positioned to project the laser beam to a predetermined elevation and rotation of the socket about the base unit axis moves the projected laser beam about the base unit axis. The brake assembly is located in the socket unit and has a shoe portion that engages the spherical body thereby to hold it at a constant position when the socket rotates about the base unit axis.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
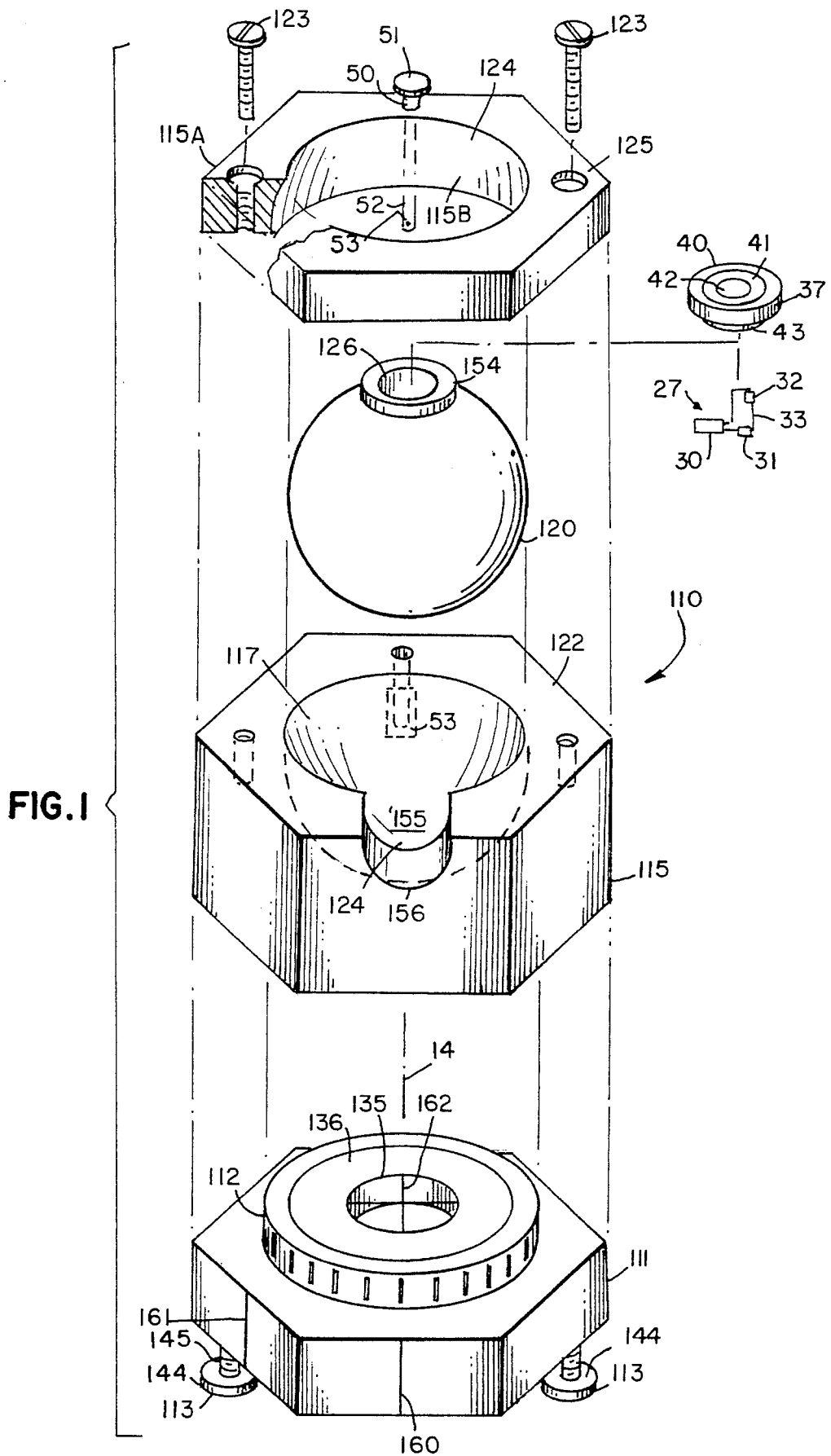
FIG. 1 is an exploded view of an optical plumb and leveler apparatus constructed in accordance with this invention.

Referring now to the FIGS. 1 through 6 generally but with particular reference to FIG. 1, an optical plumb and leveler apparatus 110 constructed in accordance with this invention comprises a base unit 111 that carries a needle- or ball-bearing unit 112 and adjustable feet 113. The adjustable feet 113 allow the base unit 111 to be leveled normally in a horizontal plane, as known in the art. When the base unit 111 is level, the bearing unit 112 defines a base unit axis of rotation 14 that is vertical. Normally the base unit 111 will be constructed of a high density, thermal stabling, readily machinable material in order to provide overall stability of the plumb bob and leveler 110 in use.

A socket unit 115 includes a bottom bearing portion 116 that engages and mates with the bearing unit 112 so the socket unit 115 can rotate about the base unit axis 14. A hemispherical cavity 117 in the socket unit 115 receives a rotatable body 120 that, in this preferred embodiment, has a spherical shape. Thus, both the cavity 117 and the rotatable body 120 have corresponding forms or profiles and the rotatable body 120 can move readily in any direction with respect to the socket unit 115. The socket unit 115 will normally be constructed of the same material as the base unit 111. The rotatable body could be constructed from a synthetic material such as nylon, a Teflon-coated material or other material that will slide easily within the cavity 117.

An upstanding peripheral wall 122 of the socket unit 115 forms the cavity 117. An optional retainer 115A may attach to the socket unit 115 to capture the rotatable body 120 within the socket unit 115 by machine screws 123 or the like. In this embodiment, the retainer 115A has a circular opening 124 with a diameter that is smaller than the diameter of the rotatable body 120. The retainer 115A also has a curved surface 115B for engaging the counterfacing portions of the rotatable body 120 when the socket unit 115 and retainer 115A are assembled. In this configuration, a portion of the rotatable body 120 extends through the opening 124 above an upper surface 125 of the retainer 115A as shown in FIG. 3.

Figure 2:
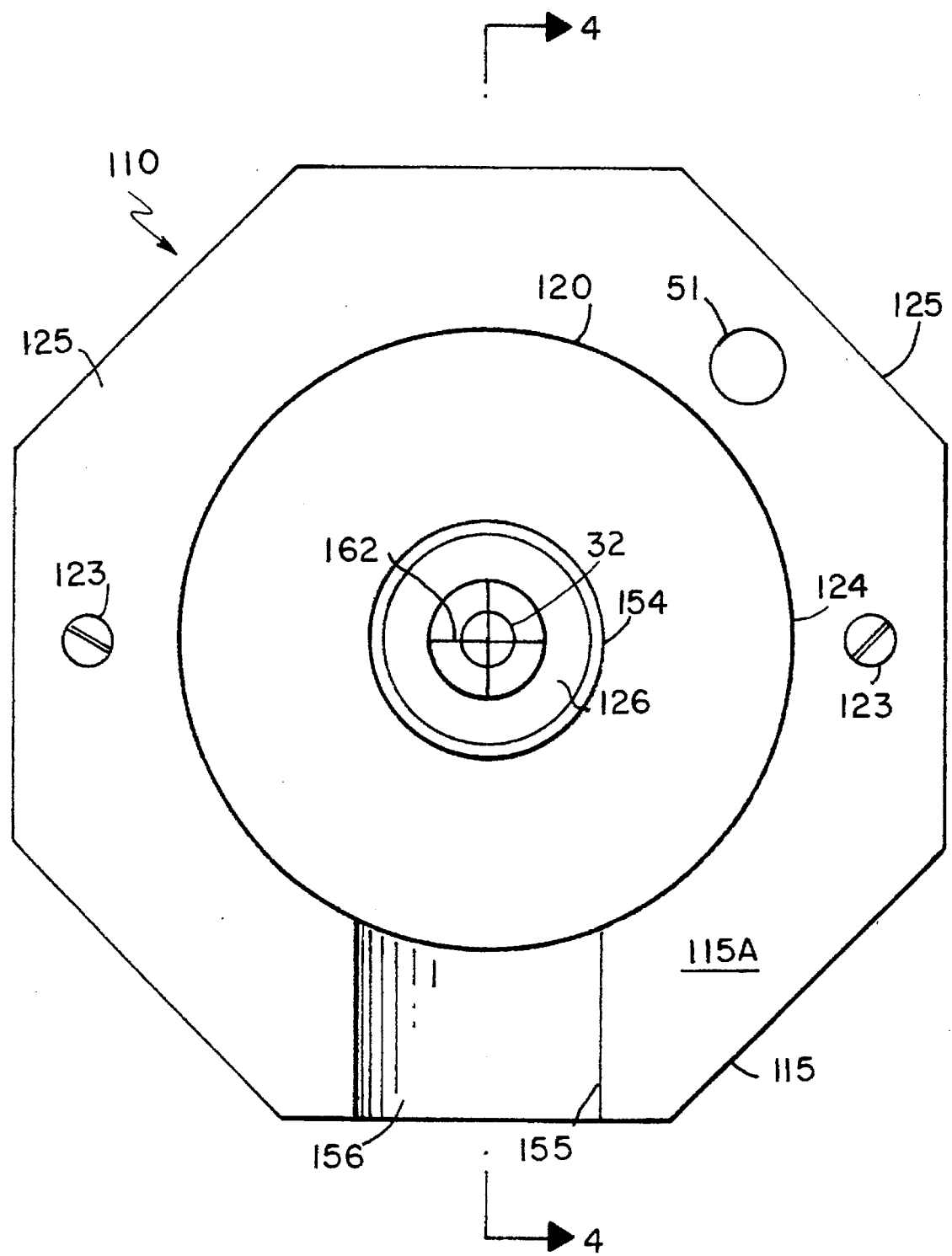
FIG. 2 is a top view of the optical plumb and leveler apparatus in FIG. 1.
Figure 3:
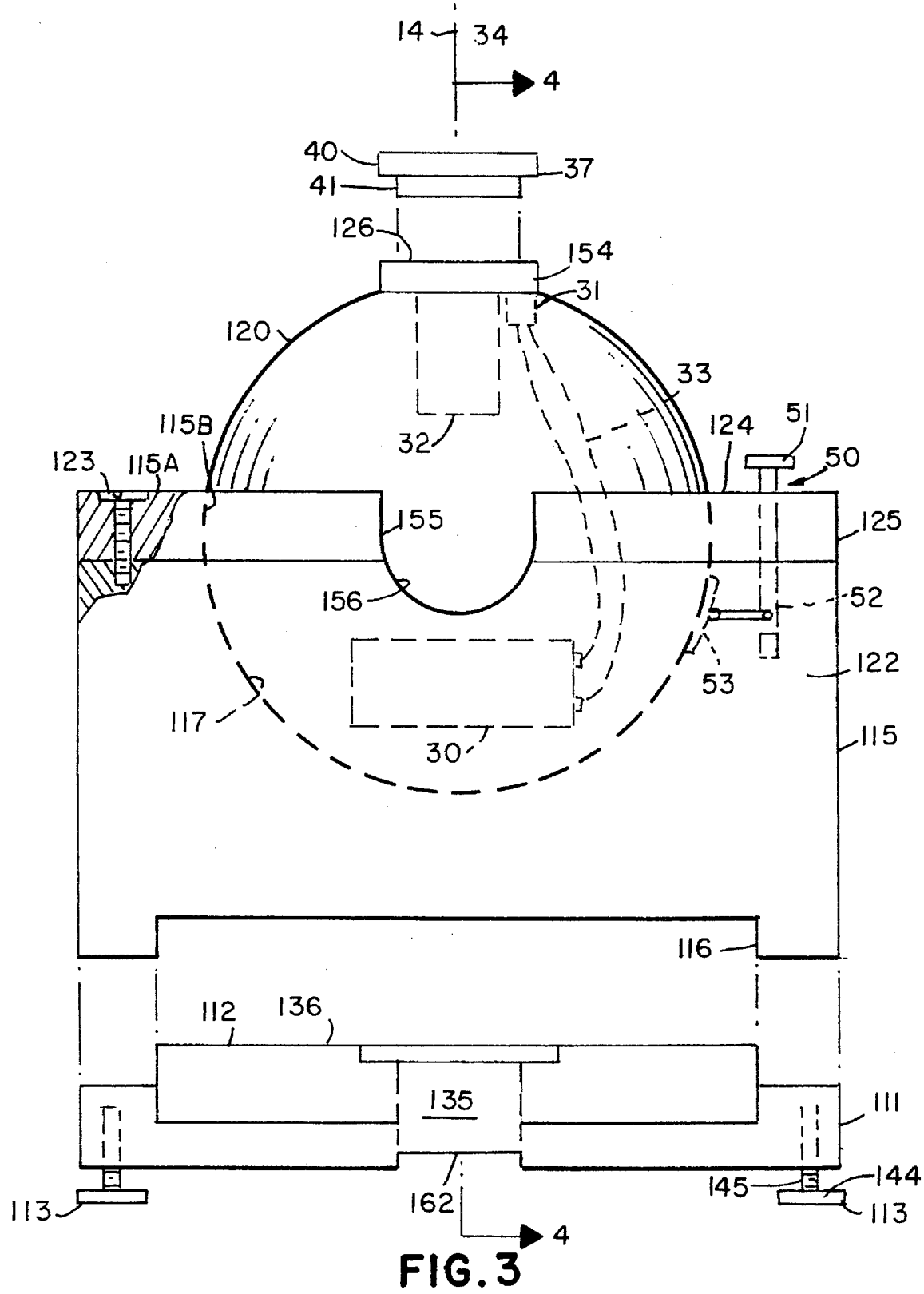
FIG. 3 is a side view partially in section, of the optical plumb bob leveler in FIG. 1.

Still referring to FIGS. 1 through 3, the rotatable body 120 additionally includes a recessed compartment 126 that carries a laser light source 27. In this particular embodiment, the laser light source 27 includes a battery 30 and switch 31 that selectively energize a light-emitting laser diode 32 through wiring 33. The laser light source 27 may include optics in the form of an aperture or collimator. The recessed compartment 126 may include supporting structure or may receive, as a subassembly, supporting structure for carrying the various components of the laser light source 27. Any such structure should align the laser diode 32 and associated optics so that a laser projection axis 34 lies along a radius from the center point of the rotatable body 120.

Figure 4:
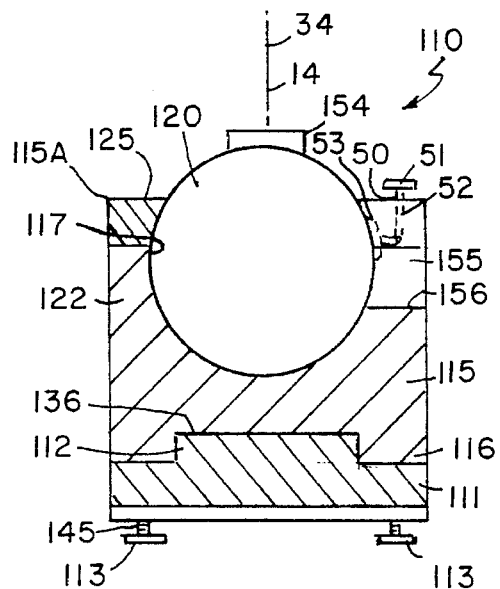
FIG. 4 is a cross-section of the optical plumb and leveler apparatus taken along lines 4—4 in FIG. 3 for producing a vertical beam.
Figure 5:
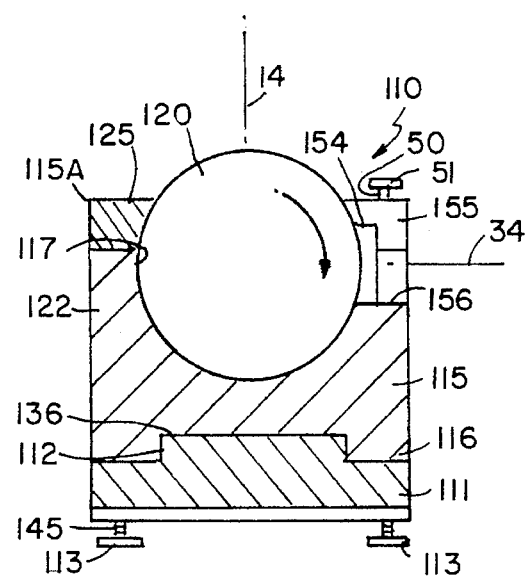
FIG. 5 is a cross-section taken of the optical plumb and leveler apparatus of FIG. 1 along lines 4—4 in FIG. 3 for producing a horizontal beam.
Figure 6:
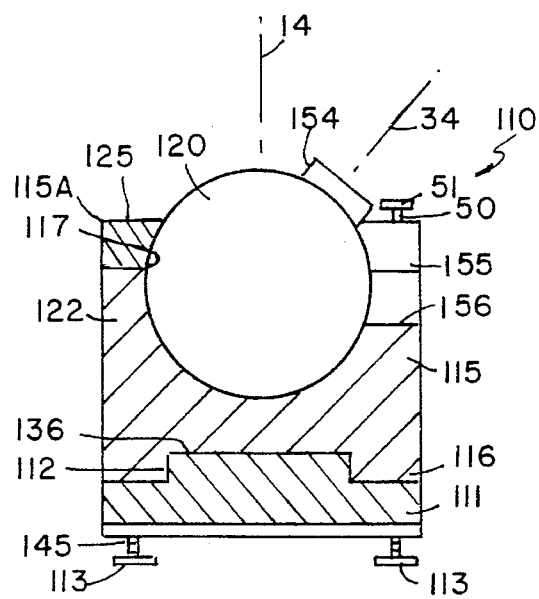
FIG. 6 a cross-section of the optical plumb and leveler apparatus of FIG. 1 taken along lines 4—4 in FIG. 1 for producing a beam at an intermediate angle.

As shown in FIGS. 1 through 4, the laser projection axis 34 aligns with the base unit axis 14 and is vertical when the base unit 111 is horizontal. In FIG. 5 the rotatable body 120 is displaced 90° from FIG. 4 so the laser projection axis 34 extends horizontally. In this position rotation of the socket unit 115 causes the projection laser axis 34 to move in a horizontal plane. In FIG. 6 the rotatable body 120 is in an intermediate position such that the laser projection axis 34 is at an angle intermediate the vertical and horizontal positions.

Referring now in more detail to the structure and operation of this optical plumb bob leveler 110, the base unit 111 readily detaches from the socket unit 115. When detached, the base unit 111 exposes a circular central recess 135 that defines a shelf surface 136. When the plane of the shelf surface 136 is horizontal, the axis of rotation 14 is vertical. The shelf 135 receives a conventional circular level 37, that, as known, has a housing 40 and a window 41 that provides visible access to an air bubble 42 in a liquid in the circular level 37. To facilitate use, a circular body portion 43 or extension is adapted to be located in the recess 135.

Each of the adjustable legs 113 includes a foot 144 and machine screw 145 tapped into the base unit 111. Each of the legs 113 can be adjusted to bring the shelf surface 136 and circular level 37 into a horizontal plane and consequently bring the axis of rotation 14 into a true vertical or into plumb. Once the base unit 111 is leveled, the circular level 37 is removed and the socket unit 115 and rotatable body 120 are located on the base unit 111. The socket unit 115 is now adapted for rotation about the vertical axis of rotation 14.

The socket unit 115 can also carry a mechanical friction brake assembly 50 of a conventional form. As disclosed in this particular embodiment, such a brake 50 might be located in the retainer 115A and include an operator 51 for Operating a conventional linkage 52 thereby to displace a brake shoe 53 into contact with a portion of the cylindrical outer surface of the rotatable body 120. Such a brake 50 would inhibit motion of the rotatable body 120 in one position and allow rotation in another position. Such brake assemblies are well known in the art.

The rotatable body 120 may also comprise a cylindrical extension 154 that is coaxial with the projection axis 34 to define at the end of the extension 154 a plane that is normal to the projection axis 34 and that is spaced from the rotatable body 120. This extension 154 can perform either or both of two functions. First, the extension 154 can receive the circular level 37. That is, once the base unit 111 is horizontal and the socket unit 115 is installed, the circular level 37 can be inserted into the extension 154. Then the rotatable body 120 is rotated until the circular level 37 indicates that the projection axis 34 is vertical. Thereafter the circular level 37 can be removed and the laser energized to project a beam along the projection axis 34 that, as shown in FIG. 4, is coincident with the vertical axis 14. In this position therefore the apparatus 110 operates as a plumb and leveler apparatus to define a vertical position.

It is also possible to use a subassembly of the plumb and leveler and leveller apparatus 110 in FIG. 1 to provide the plumb and leveler function. This subassembly would include the socket unit 115 and rotatable body 120, without the base unit 111. The socket unit 115 can be is placed on any reasonably horizontal surface at a reference point. Then the rotatable body 120 can be oriented with the circular level 37 in the extension 154. When the bubble 42 indicates that the circular level 37 is horizontal, the projection axis 34 will be vertical or plumb.

The apparatus 110 in FIG. 1 is also readily adapted for operating as an optical level by using the extension 154 as part of a horizontal index. Specifically, the extension 154 is sized to cooperate with a u-shaped slot 155 formed in the side 122 of the socket unit 115; that is, the extension 154 has the same outer diameter as a radiused portion 156 at the bottom of the slot 155 and the radiused surface 156 has its center on the laser projection axis 34 when the laser projection axis 34 is horizontal. Thus if the rotatable body 120 rotates in the socket unit 115 until the extension 154 nests with the radiused surface 156, the extension 154 and radius surface 156 constitute a horizontal index. In this horizontally indexed position, the laser projection axis 34 moves from a vertical position as shown in FIG. 4 to the horizontal position shown in FIG. 5. Rotating the socket unit 115 about the base unit 111 then moves the projected light beam in a horizontal plane. If the socket unit 115 is placed on an oblique plane or surface, then the laser projection axis 34 will move in a plane parallel to the oblique plane.

As shown in FIG. 6, the rotatable body 120 and brake assembly 50 enable the projection axis 34 to be held at any location intermediate the horizontal and vertical planes. This feature permits the use of the device for scribing, for example, a circle on a horizontal surface displaced above the apparatus. For such an application, the user locates the plumb position on the surface and marks the radius of the desired circle at any point from that plumb point. Then the brake 50 is released and the rotatable body 120 and the socket unit 115 are manipulated until the laser beam intersects the marked radius. After the user locks the brake assembly 50, the socket unit 115 is rotated causing the laser beam to define a circular path on the horizontal surface.

FIG. 1 also discloses two indicia 160 and 161 at the center of each side of the base unit 111. These, or other indicia, that can also be located on the side of the socket unit 115, provide a means for aligning the base unit 111 over a reference point. When the base unit 111 is positioned without the socket unit 115, the use of cross hairs 162 spanning the recess 135 and centered on the base unit axis of rotation 14 can also facilitate this alignment.

Figure 7:
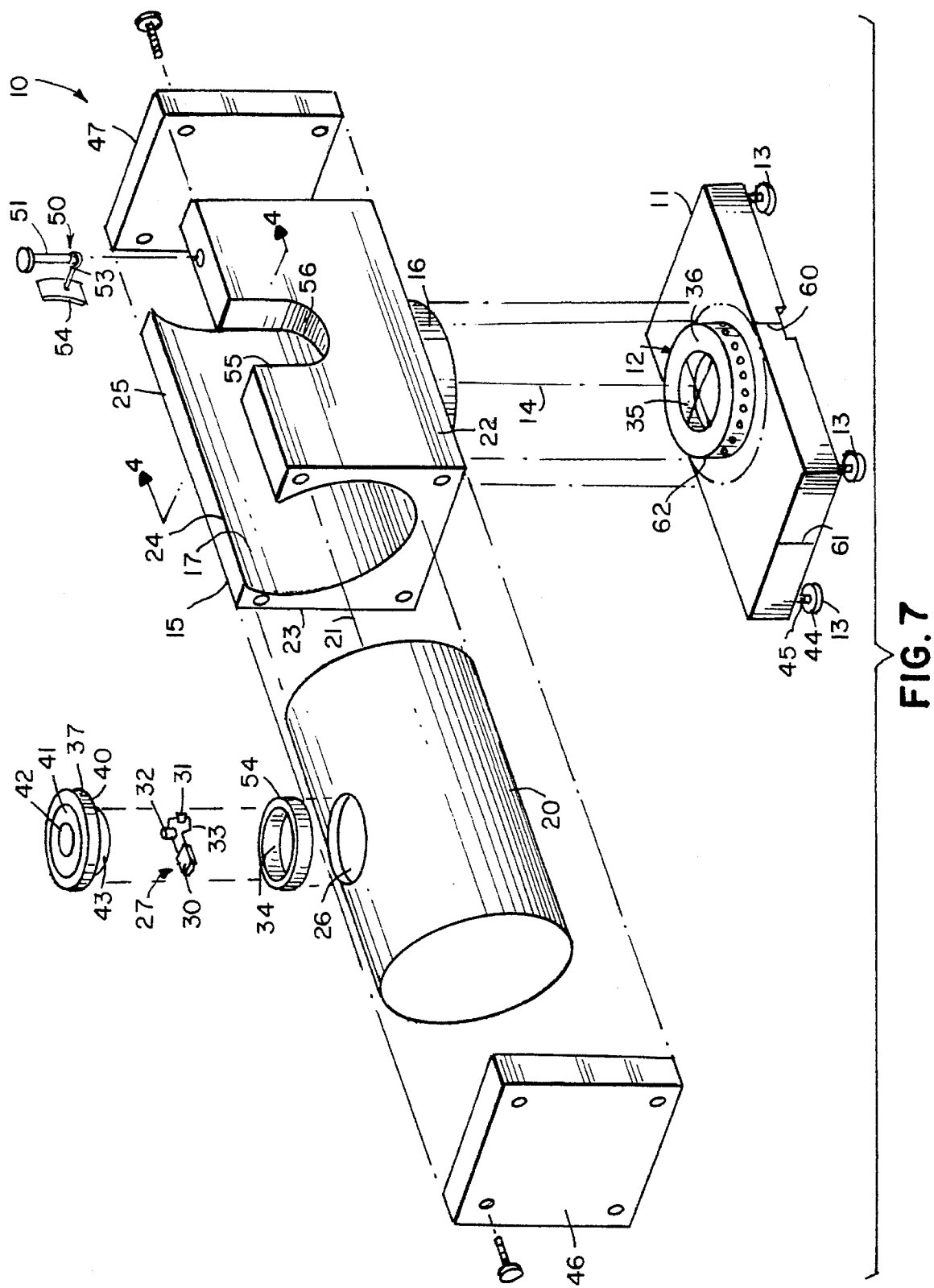
FIG. 7 is an exploded view of another embodiment of an optical plumb and leveler apparatus constructed in accordance with this invention.
Figure 8:
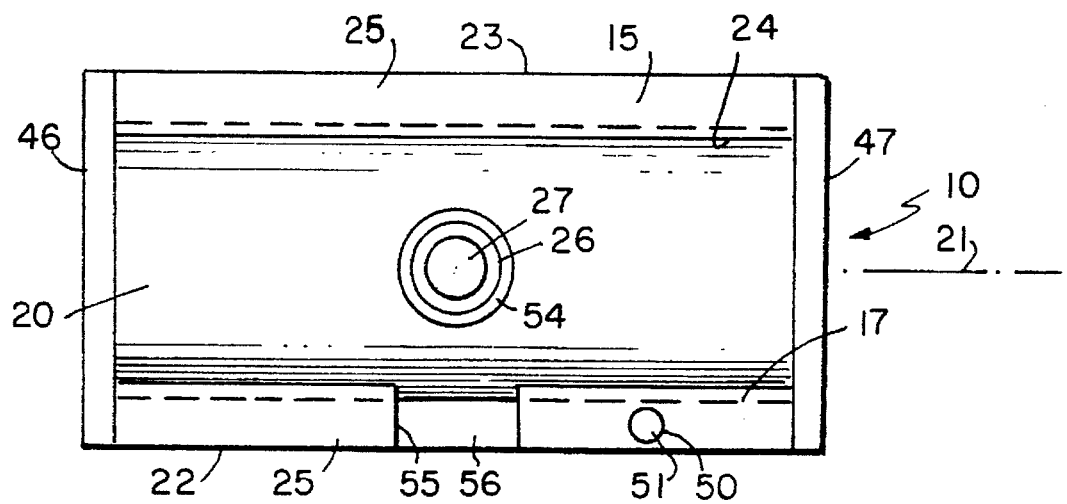
FIG. 8 is a top view of the optical plumb and leveler apparatus in FIG. 7.
Figure 9:
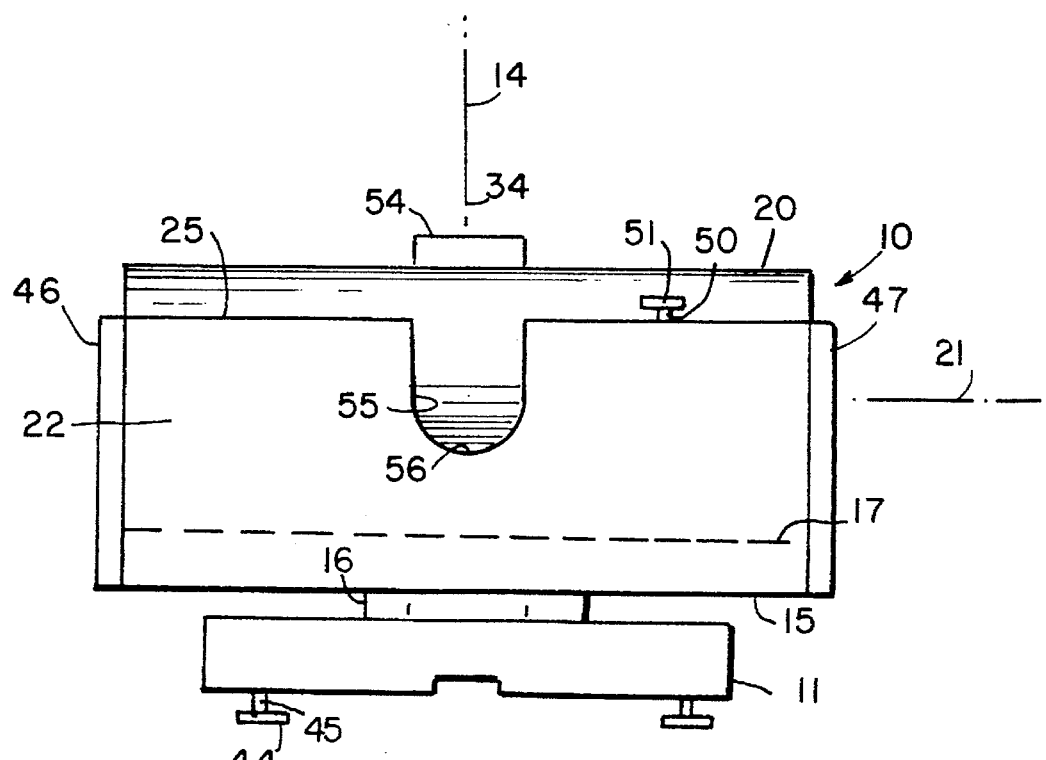
FIG. 9 is a side view partially in section, of the optical plumb and leveler apparatus in FIG. 7.

FIGS. 7 through 9 depict an alternative embodiment wherein, like the embodiment of FIGS. 1 through 6, an optical plumb bob leveler 10 comprises a base unit 11 that carries a bearing unit 12 and adjustable feet 13 for defining a base unit axis of rotation 14 that is vertical. A socket unit 15 with a bottom bearing portion 16 engages and mates with the bearing unit 12 so the socket unit 15 can rotate about the base unit axis 14.

In this embodiment, however, a cavity 17 in the socket unit 15 receives a cylindrical rotatable body 20 that extends coaxially along a cavity axis 21 that is at right angles to the base unit axis of rotation 14. Consequently if the base unit 11 is horizontal, the cavity axis 21 revolves in a horizontal plane when the socket unit 15 rotates around the base unit axis of rotation 14. The rotatable body 20 is additionally adapted to rotate around the cavity axis 21 within the cavity 17.

Upstanding side walls 22 and 23 of the socket unit 15 form portions of the cavity 17 and define an opening 24 therebetween. A portion of the rotatable body 20 extends through the opening 24 above an upper surface 25 of the socket unit 15.

The rotatable body 20 also includes a recessed compartment 26 that carries the laser light source 27. Like the device shown in FIGS. 1 through 6, it is merely necessary that the recessed compartment 26 support or carry a structure that supports the laser light source 27 so the laser projection axis 34 lies along a radius of the rotatable body 20 extending from the intersection of the axes 14 and 21.

Like the apparatus 110 in FIGS. 1 through 6 the base unit 11 in FIG. 7 includes a central aperture 35 surrounded by a shelf 36. Each of the adjustable legs 13 includes a foot 44 and machine screw 45 tapped into the base unit 11. Each of the legs 13 can be adjusted to bring a shelf surface 36 and the circular level 37 on the shelf 36 into a horizontal plane and consequently bring the axis of rotation 14 into a true vertical. Once the base unit 11 is leveled, the circular level 37 is removed and is located on the base unit 11. The socket unit 15 is now adapted for installation in the base unit 11 and rotated about the vertical axis of rotation 14.

Typically end plates 46 and 47.will capture the rotatable body 20 within the socket unit 15 in a manner known in the art. Moreover, this socket unit 15 can also carry a mechanical friction brake 50 having a brake shoe 53 adapted for engaging a cylindrical surface.

The rotatable body 20 may also comprise a cylindrical extension 54 that is coaxial with the projection axis 34 to define at the end of the extension 54 a plane that is normal to the projection axis 34 and that is spaced from the rotatable body 20. This extension 54 can perform the same functions as described with respect to the extension 154 in FIGS. 1 through 6. That is, the extension 54 can be sized to cooperate with a u-shaped slot 55 with a radiused surface 56 formed in the side 22 of the socket unit 15 and to form a horizontal index. In this horizontal indexed position, the projection axis 34 is horizontal provided the base unit 111 is horizontal.

FIG. 7 also discloses two indicia 60 and 61 at the center of each side and cross hairs 62 spanning the central aperture 35. These, or other indicia, facilitate the alignment of the base unit 11 over a reference point.

The foregoing description discloses two specific embodiments of apparatus for performing plumb bob and leveling functions. Each device is accurate because each element is aligned and leveled on site with a circular level or similar device. Each of the components is simple to manufacture; and the apparatus does not require undue assembly. Consequently the apparatus is relatively easy to manufacture at a cost that allows amateur and professional personnel to afford its acquisition even for use on an occasional basis.

It will also be apparent that many modifications can be made to the specifically disclosed embodiment without departing from the spirit and scope of the invention. A specific braking assembly is shown. Such a braking assembly might be eliminated if precise machining could establish controlled friction between the rotatable body 120 and the surface of the socket unit 115 forming the cavity 117. Different bearing structures might be substituted for the specifically disclosed ball and needle bearing structures. It would also be possible, for example, to substitute indexing mechanisms to predetermine the positions at which the projection axis 34 is coincident with the axis of rotation 14 and a position at which the projection axis 34 is at right angles to the axis 14.

Therefore, it is the intent of the appended claims to cover all such variations and modifications as come within the true spirit and scope of this invention.

What is claimed as new and desired to be secured by Letters Patent of the United States is:

1. An optical plumb apparatus for use with a leveling device comprising:
  A. a rotatable body having a circular cross section about a center point and including a recessed compartment formed in said rotatable body,
  B. a socket unit including a cavity corresponding in form to a portion of said rotatable body whereby said rotatable body is adapted to rotate relative to said socket unit about the center point,
  C. laser means located in said recessed compartment for projecting a laser beam along a laser projection axis that lies on a radius from the center point,
  D. said rotatable body comprises means for receiving the leveling device whereby the leveling device indicates when said rotatable body is oriented with the laser projection axis in a predetermined direction; and
  E. a base unit for supporting said socket unit, said base unit having means for adjusting the level thereof and a reference shelf thereon for receiving the leveling device;
  F. said base unit and said socket unit include complementary bearing means for enabling said socket unit to rotate about an axis of rotation that is vertical when said base unit is level.

2. An optical plumb apparatus as recited in claim 1 wherein said rotatable body has a spherical shape and said socket cavity has a corresponding hemispherical shape.

3. An optical plumb apparatus as recited in claim 2 wherein said socket unit additionally comprises means for retaining said spherical rotatable body in said socket unit.

4. An optical plumb apparatus as recited in claim 1 wherein said rotatable body has a cylindrical shape and said socket cavity has a corresponding semi-cylindrical shape.

5. An optical plumb apparatus as recited in claim 4 wherein said socket unit additionally comprises means for retaining said rotatable body in said socket unit.

6. An optical plumb apparatus as recited in claim 1 wherein said laser means includes an interconnected battery, switch and laser diode and means for supporting said laser means within said recessed compartment whereby light emitted from said laser diode is directed along the laser projection axis.

7. An optical plumb apparatus as recited in claim 1 wherein said rotatable receiving means defines a reference plane normal to the laser projection axis and the leveling device comprises a circular level that can rest on said reference plane whereby moving the reference plane to a horizontal position positions said rotatable body with the laser projection axis in a vertical position.

8. An optical plumb apparatus as recited in claim 1 wherein said socket unit additionally comprises means for adjusting the orientation thereof such that said socket unit can be oriented in a predetermined plane.

9. An optical plumb apparatus as recited in claim 1 wherein said socket unit and said rotatable body additionally comprise complementary index means for defining a horizontal position of the laser projection axis when said base unit is level whereby said optical plumb bob is additionally adapted for transferring a level to a remote location.

10. An optical plumb and leveler comprising:
  A. a base unit for positioning in a horizontal plane, said base unit including bearing means for defining a base unit axis of rotation,
  B. a rotatable body having a predetermined peripheral shape and a circular cross-section about a center point and including a radially extending recessed compartment formed at a predetermined location in said rotatable body that includes the center point,
  C. a socket unit including
    (i) means for engaging said bearing means whereby said socket unit can rotate about the base unit axis of rotation, and
    (ii) means forming a cavity corresponding to the peripheral shape of said rotatable body, and
  D. laser means located in said recessed compartment for projecting a laser beam along a laser projection axis that is a radius from the center point whereby said rotatable body can be positioned to project the laser beam to a predetermined elevation and whereby rotation of said socket unit about the base unit axis moves the projected laser beam about the base unit axis.

11. An optical plumb and leveler as recited in claim 10 wherein said predetermined peripheral shape is a spherical shape and said socket cavity has a corresponding hemispherical shape.

12. An optical plumb and leveler as recited in claim 11 wherein said socket unit additionally comprises means for retaining said spherical rotatable body in said socket unit.

13. An optical plumb and leveler as recited in claim 10, wherein said predetermined peripheral shape is a cylindrical shape and said socket cavity has a corresponding semi-cylindrical shape.

14. An optical plumb and leveler as recited in claim 13 wherein said socket unit additionally comprises means for retaining said cylindrical rotatable body in said socket unit.

15. An optical plumb and leveler as recited in claim 10 wherein said laser means includes an interconnected battery, switch and laser diode and means for supporting said laser means within said recessed compartment whereby light emitted from said laser diode is directed along the laser projection axis.

16. An optical plumb and leveler as recited in claim 10 wherein said socket unit additionally comprises brake means for engaging and holding said rotatable body at a constant position.

17. An optical plumb and leveler as recited in claim 10 wherein said base unit includes means for adjusting the level of said base unit and the orientation of the base unit axis.

18. An optical plumb and leveler as recited in claim 10 additionally comprising shelf means extending from said recessed compartment for receiving a level indicator that is parallel to the base unit when the laser projection axis is vertical.

19. An optical plumb and leveler as recited in claim 10 wherein said socket unit includes an aperture therethrough coincident with the laser projection axis in a horizontal orientation whereby said laser beam projects through said aperture.

20. An optical plumb and leveler as recited in claim 19 wherein said aperture comprises an open-ended slot and wherein said optical plumb bob additionally comprises means extending from said recessed compartment coaxially with the laser projection axis for engaging said slot thereby to index said laser projection axis to the horizontal when the base unit axis is vertical.

21. An optical plumb and leveler as recited in claim 10 wherein said laser means includes an interconnected light-emitting laser diode, battery and switch.

22. An optical plumb and leveler comprising:
  A. a base unit including:
    i. adjustable feet for positioning said base unit in a horizontal plane, and
    ii. bearing means for defining a base unit axis of rotation that is vertical when said base unit is oriented in the horizontal plane,
  B. a socket unit including
    i. means for engaging said bearing means whereby said socket unit can rotate about the base unit axis of rotation, and
    ii. a hemispherical cavity in said socket unit,
  C. a spherical body corresponding to the cross section of said cavity and located in said cavity for rotation relative thereto and including a radially extending, recessed compartment,
  D. laser means including a battery-operated laser projection means located in said recessed compartment for projecting a laser beam along a laser projection axis that lies along a radius of said spherical body whereby said spherical body can be positioned to project the laser beam to a predetermined elevation and whereby rotation of said socket unit about the base unit axis moves the projected laser beam about the base unit axis, and
  E. brake means located on said socket unit for engaging said spherical body thereby to hold the spherical body at a constant position when said socket unit rotates about the base unit axis.

23. An optical plumb and leveler as recited in claim 22 wherein said recessed compartment has a circular cross section and wherein said spherical body additionally comprises a cylindrical extension extending from said recessed compartment coaxially with the laser projection axis and said socket unit includes horizontal index means for engaging said extension when said laser projection axis is horizontal.

24. An optical plumb and leveler as recited in claim 23 wherein said cylindrical extension terminates in a planar surface that is normal to the laser projection axis and wherein said optical plumb and leveler apparatus additionally comprises circular leveling means for mounting in said extension whereby said spherical body is positioned with the laser projection axis coincident with the axis of rotation.

25. An optical plumb and leveler as recited in claim 24 wherein said socket unit is detachable from said base unit and wherein said base unit includes means for receiving said leveling device whereby said base unit can be leveled with said socket unit removed therefrom.

26. An optical plumb and leveler as recited in claim 25 wherein said base unit additionally includes indicia thereon for aligning said base unit vertically.

27. An optical plumb and leveler as recited in claim 25 wherein said laser means comprises an interconnected light-emitting laser diode, battery and switch and wherein said spherical body additionally comprises means for supporting said laser means within said recessed compartment.

\* \* \* \* \*